US012210891B2

(12) United States Patent
Jiang et al.

(10) Patent No.: US 12,210,891 B2
(45) Date of Patent: Jan. 28, 2025

(54) MODIFYING DEVICE STATUS IN SINGLE VIRTUAL FUNCTION MODE

(71) Applicants: ADVANCED MICRO DEVICES (SHANGHAI) CO., LTD., Shanghai (CN); ATI TECHNOLOGIES ULC, Markham (CA)

(72) Inventors: Yinan Jiang, Markham (CA); ZhenYu Min, Shanghai (CN); WenWen Tang, Shanghai (CN)

(73) Assignees: ADVANCED MICRO DEVICES (SHANGHAI) CO., LTD., Shanghai (CN); ATI TECHNOLOGIES ULC, Markham (CA)

( * ) Notice: Subject to any disclaimer, the term of this patent is extended or adjusted under 35 U.S.C. 154(b) by 198 days.

(21) Appl. No.: 17/126,315

(22) Filed: Dec. 18, 2020

(65) Prior Publication Data
US 2022/0197679 A1 Jun. 23, 2022

(51) Int. Cl.
G06F 9/455 (2018.01)
G06F 9/48 (2006.01)
G06F 11/30 (2006.01)
G06F 11/34 (2006.01)

(52) U.S. Cl.
CPC ........ *G06F 9/45558* (2013.01); *G06F 9/4812* (2013.01); *G06F 11/3024* (2013.01); *G06F 11/3409* (2013.01)

(58) Field of Classification Search
CPC .. G06F 9/45558; G06F 9/4812; G06F 9/4881; G06F 11/3024; G06F 11/3409; G06F 2009/45579
See application file for complete search history.

(56) References Cited

U.S. PATENT DOCUMENTS

| 8,387,075 B1 * | 2/2013 | McCann | G06F 9/52 719/328 |
|---|---|---|---|
| 10,824,349 B1 * | 11/2020 | Chan | G06F 3/0673 |
| 2011/0154006 A1 * | 6/2011 | Natu | G06F 21/74 713/2 |
| 2012/0260042 A1 * | 10/2012 | Henry | G06F 9/30174 711/E12.017 |
| 2013/0174144 A1 * | 7/2013 | Cheng | G06T 1/20 718/1 |
| 2015/0149661 A1 * | 5/2015 | Kanigicherla | G06F 13/10 710/62 |

(Continued)

Primary Examiner — Lewis A Bullock, Jr.
Assistant Examiner — Kevin X Lu

(57) ABSTRACT

A processing system includes physical function circuitry to execute virtual functions and a processing unit configured to operate in a first mode that allows more than one virtual function to execute on the physical function circuitry and a second mode that constrains the physical function circuitry to executing a single virtual function. A first virtual function modifies a state of the processing unit in response to the processing unit being in the second mode. A host driver executing on the processing unit modifies an operating mode indicator to indicate that the processing unit is operating in the first mode or to indicate that the processing unit is operating in the second mode. Microcode executing on the processing unit accesses the operating mode indicator to determine whether the processing unit is operating in the first mode or the second mode.

20 Claims, 5 Drawing Sheets

(56) References Cited

U.S. PATENT DOCUMENTS

| | | | |
|---|---|---|---|
| 2016/0098365 A1* | 4/2016 | Bshara | G06F 13/24 |
| | | | 710/313 |
| 2018/0052701 A1* | 2/2018 | Kaplan | G06F 9/45558 |
| 2018/0113731 A1* | 4/2018 | Cheng | G06T 1/20 |
| 2019/0018699 A1* | 1/2019 | Asaro | G06F 9/485 |
| 2019/0188001 A1* | 6/2019 | Mehra | G06F 9/4403 |
| 2019/0294611 A1* | 9/2019 | Beaumont | G06F 16/90339 |
| 2019/0294925 A1* | 9/2019 | Kang | G06K 9/6256 |
| 2020/0192679 A1* | 6/2020 | Chan | G06F 9/4411 |
| 2020/0334064 A1* | 10/2020 | Jiang | G06F 13/4282 |
| 2021/0103580 A1* | 4/2021 | Schierz | G06F 16/2365 |
| 2021/0209040 A1* | 7/2021 | Rugina | G06F 11/0772 |
| 2021/0256454 A1* | 8/2021 | Nikolaev | G06F 16/9538 |
| 2022/0292396 A1* | 9/2022 | Biryukov | G06N 7/005 |

* cited by examiner

MODIFYING DEVICE STATUS IN SINGLE VIRTUAL FUNCTION MODE

BACKGROUND

Processing units such as graphics processing units (GPUs) support virtualization that allows multiple virtual machines to use the hardware resources of the GPU. Each virtual machine executes as a separate process that uses the hardware resources of the GPU. Some virtual machines implement an operating system that allows the virtual machine to emulate an actual machine. Other virtual machines are designed to execute code in a platform-independent environment. A hypervisor creates and runs the virtual machines, which are also referred to as guest machines or guests. The virtual environment implemented on the GPU provides virtual functions to other virtual components implemented on a physical machine. A single physical function implemented in the GPU is used to support one or more virtual functions. The physical function allocates the virtual functions to different virtual machines on the physical machine on a time-sliced basis. For example, the physical function allocates a first virtual function to a first virtual machine in a first time interval and a second virtual function to a second virtual machine in a second, subsequent time interval. In some cases, a physical function in the GPU supports as many as thirty-one virtual functions, although more or fewer virtual functions are supported in other cases. The single root input/output virtualization (SR-IOV) specification allows multiple virtual machines (VMs) to share a GPU interface to a single bus, such as a peripheral component interconnect express (PCIe) bus. Components access the virtual functions by transmitting requests over the bus.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
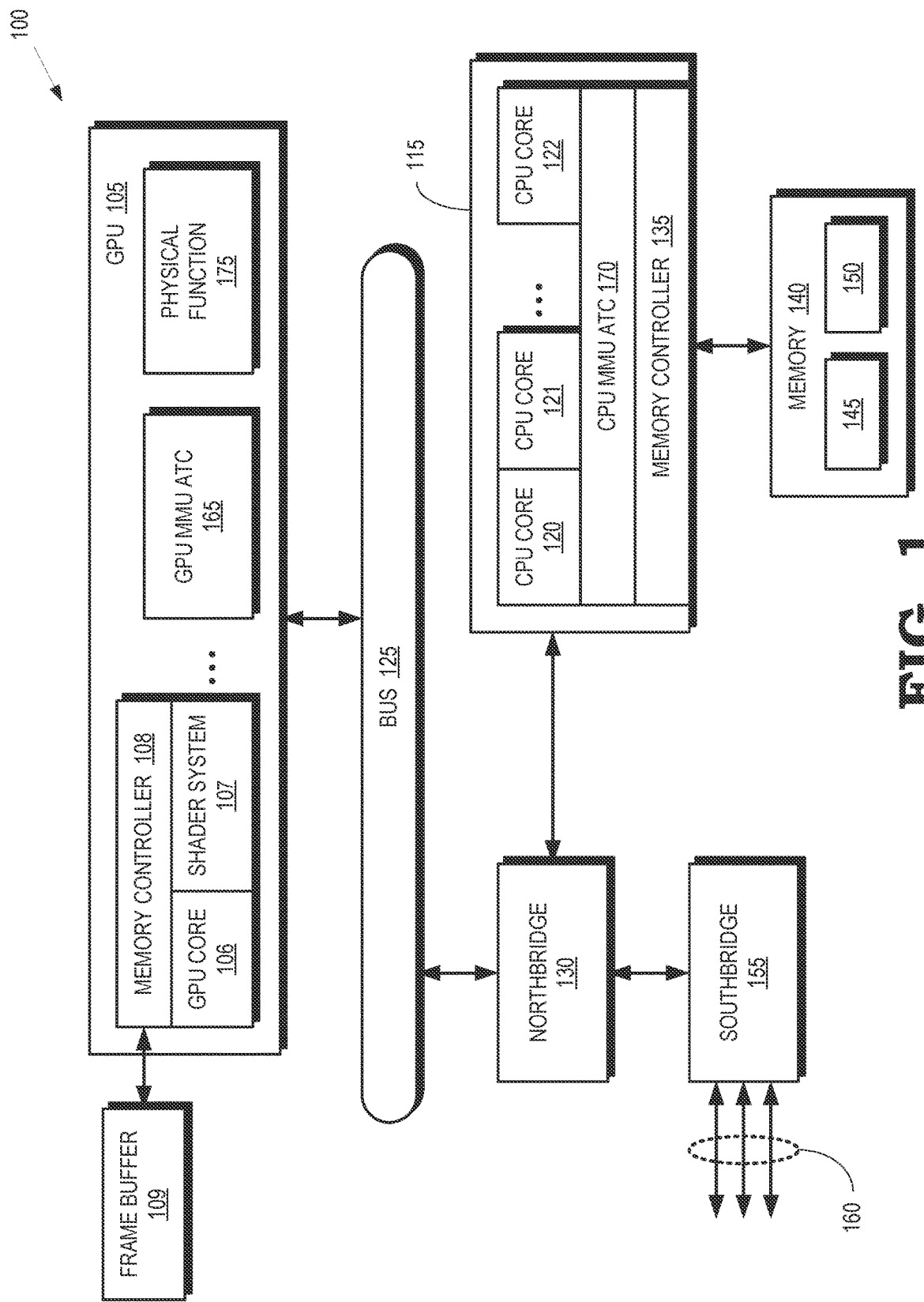
FIG. 1 is a block diagram of a processing system that allows modifications to a device state when the device is operating in a single virtual function (single-VF) mode according to some embodiments.

The hardware resources of a GPU are partitioned according to SR-IOV using a physical function (PF) and one or more virtual functions (VFs). Each virtual function is associated with a single physical function. In a native (host OS) environment, a physical function is used by native user mode and kernel-mode drivers and all virtual functions are disabled. All the GPU registers are assigned to the physical function via trusted access. In a virtual environment, the physical function is used by a hypervisor (host VM) and the GPU exposes a certain number of virtual functions as per the PCIe SR-IOV standard, such as one virtual function per guest VM. Each virtual function is assigned to the guest VM by the hypervisor. Subsets of the GPU resources are mapped to the virtual functions and the subsets are partitioned to include a frame buffer, context registers, a doorbell aperture, and one or more mailbox registers used for VF-PF synchronization.

A GPU that operates according to SR-IOV implements an isolation policy to provide security and safeguard the integrity of the GPU state while concurrently executing multiple VFs. For example, the isolation policy prevents any of the VFs from modifying a state of the GPU because modifications to the GPU state by one VF can affect operation of another VF. Although SR-IOV is typically used to configure a GPU to support multiple VF, the GPU can also operate in a single-VF mode. For example, the single-VF mode is used by performance analysis tools that run as a VF on the GPU. Performance analysis tools assess the performance of the GPU under different conditions and in different states. Thus, performance analysis tools are required to modify the state of the GPU. In order to satisfy the isolation policy, the performance analysis tool sends a request for a state modification through a guest driver to a mailbox register associated with the VF and the host driver reads the request from the mailbox register. The host driver performs the requested modification of the GPU status or passes the requests (and any required device information) to microcode (running on the GPU) that performs the requested modification. An acknowledgment or result of the modification performed by the host driver or the microcode is then passed back to the performance analysis tool via the mailbox register by the guest driver. However, the isolation policy is unnecessary when the GPU is running in the single-VF mode because there are no other VF to be affected by the change in the GPU status. Thus, the handshake between the host driver and the guest driver introduces unnecessary overhead.

FIGS. 1-5 disclose systems and techniques that reduce or eliminate overhead incurred by the handshake between the host driver and the guest driver by allowing a virtual function (VF) executing on a processing unit (such as a GPU) to modify a state of the processing unit in response to determining that the processing unit is operating in a single-VF mode that only permits one VF to execute on the processing unit. An indication of the operating mode of the processing unit (e.g., multi-VF or single-VF) is stored in an SR-IOV configuration space of the processing unit. The host driver updates the indication when it configures the processing unit. Microcode (executing on the processing unit) accesses the operating mode indicator to determine whether the processing unit is operating in the single-VF mode. If so, the VF is permitted to issue interrupts to a system management unit (SMU) and the SMU is configured to respond to the interrupts. For example, the VF can issue an interrupt to the SMU to request modifications to the state of the processing unit. Microcode executing on the SMU monitors the requests and selectively approves the requests, e.g., based on risks associated with the requested modifications. In some embodiments, the single VF executing on the processing unit is allowed to modify one or more of a clock running on the processing unit, a dynamic power management (DPM) state of the processing unit, and the like. For example, a performance monitoring tool executed by the VF can modify a graphics clock, a memory clock, or a power state of the processing unit. The performance monitoring tool then performs measurements (e.g., of one or more performance counters) to assess the impact of the modification. If the microcode determines that the processing unit is operating in the multi-VF mode, the microcode disables interrupt notification between the VF and the SMU. Requests on the VF to the SMU are not signaled to SMU. The host driver also denies requests from the VF to change the processing unit state because the changes introduce unexpected results to the other VF running on the processing unit. Thus, in the multi-VF mode, the VF may attempt to change the GPU state either by sending state modification through mailbox register to host driver or sending state modification requests directly to the SMU. However, the host driver also denies these requests to modify the state of the GPU.

FIG. 1 is a block diagram of a processing system 100 that allows modifications to a device state when the device is operating in a single-VF mode according to some embodiments. The techniques described herein are, in different embodiments, employed at any of a variety of parallel processors, such as vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like. FIG. 1 illustrates an example of a parallel processor, and in particular a graphics processing unit (GPU) 105, in accordance with some embodiments. However, reference to a GPU herein will be understood to include any of a variety of parallel processors unless otherwise noted.

The GPU 105 includes one or more GPU cores 106 that independently execute instructions concurrently or in parallel and one or more shader systems 107 that support 3D graphics or video rendering. For example, the shader system 107 can be used to improve visual presentation by increasing graphics rendering frame-per-second scores or patching areas of rendered images where a graphics engine did not accurately render the scene. A memory controller 108 provides an interface to a frame buffer 109 that stores frames during the rendering process. Some embodiments of the frame buffer 109 are implemented as a dynamic random access memory (DRAM). However, the frame buffer 109 can also be implemented using other types of memory including static random access memory (SRAM), nonvolatile RAM, and the like. Some embodiments of the GPU 105 include other circuitry such as an encoder format converter, a multiformat video codec, display output circuitry that provides an interface to a display or screen, and audio coprocessor, an audio codec for encoding/decoding audio signals, and the like.

The processing system 100 also includes a central processing unit (CPU) 115 for executing instructions. Some embodiments of the CPU 115 include multiple processor cores 120, 121, 122 (collectively referred to herein as "the CPU cores 120-122") that can independently execute instructions concurrently or in parallel. In some embodiments, the GPU 105 operates as a discrete GPU (dGPU) that is connected to the CPU 115 via a bus 125 (such as a PCI-e bus) and a northbridge 130. The CPU 115 also includes a memory controller 135 that provides an interface between the CPU 115 and a memory 140. Some embodiments of the memory 140 are implemented as a DRAM, an SRAM, nonvolatile RAM, and the like. The CPU 115 executes instructions such as program code 145 stored in the memory 140 and the CPU 115 stores information 150 in the memory 140 such as the results of the executed instructions. The CPU 115 is also able to initiate graphics processing by issuing draw calls to the GPU 105. A draw call is a command that is generated by the CPU 115 and transmitted to the GPU 105 to instruct the GPU 105 to render an object in a frame (or a portion of an object).

A southbridge 155 is connected to the northbridge 130. The southbridge 155 provides one or more interfaces 160 to peripheral units associated with the processing system 100. Some embodiments of the interfaces 160 include interfaces to peripheral units such as universal serial bus (USB) devices, General Purpose I/O (GPIO), SATA for a hard disk drive, serial peripheral bus interfaces like SPI, I2C, and the like.

The GPU 105 includes a GPU virtual memory management unit with address translation controller (GPU MMU ATC) 165 and the CPU 115 includes a CPU MMU ATC 170. The GPU MMU ATC 165 and the CPU MMU ATC 170 provide of virtual memory address (VA) to physical memory address (PA) translation by using a multilevel translation logic and a set of translation tables maintained by operating system kernel-mode driver (KMD). Thus, application processes that execute on the main OS or in the guest OS each have their own virtual address space for CPU operations and GPU rendering. The GPU MMU ATC 165 and the CPU MMU ATC 170 therefore support virtualization of GPU and CPU cores. The GPU 105 has its own memory management unit (MMU) which translates per-process GPU virtual addresses to physical addresses. Each process has separate CPU and GPU virtual address spaces that use distinct page tables. The video memory manager manages the GPU virtual address space of all processes and oversees allocating, growing, updating, ensuring residency of memory pages, and freeing page tables.

The GPU 105 also includes one or more physical functions (PFs) 175. In some embodiments, the physical function 175 is a hardware acceleration function such as multimedia decoding, multimedia encoding, video decoding, video encoding, audio decoding, and audio encoding. The virtual environment implemented in the memory 140 supports a physical function and a set of virtual functions (VFs) exposed to the guest VMs. The GPU 105 further includes a set of registers or other resources (not shown in FIG. 1 in the interest of clarity) that store information associated with processing performed by kernel mode units. In some embodiments, a subset of the set of resources stores information that represents a state (or operational state) of the GPU 105. Other subsets of the set of resources are allocated to store information associated with the virtual functions. These subsets of the GPU resources are mapped to the virtual functions and the subsets are partitioned to include a frame buffer, context registers, a doorbell aperture, and one or more mailbox registers used for VF-PF synchronization. The physical function 175 executes on behalf of one of the virtual functions for one of the guest VMs based on the information stored in a corresponding one of the subsets, as discussed in detail herein.

Some embodiments of the GPU 105 execute a host driver that maintains or modifies information representing an operational state of the GPU 105. For example, the GPU 105 can operate in different modes including a first mode that allows more than one VF to execute on the PF circuitry and a second mode that constrains the PF circuitry to executing a single VF. Thus, context switches or world switches between different VF are permitted in the first mode and are not needed in the second mode. The first mode is referred to as a multi-VF mode and the second mode is referred to as a single-VF mode. If the GPU 105 is operating in the single-VF mode, the single VF executing on the GPU 105 is permitted to modify the state of the GPU 105. In some embodiments, the single VF modifies the state of the GPU 105 by writing or modifying information stored in the resources that represent the operational state of the GPU 105. If the GPU 105 is operating in the multi-VF mode, the virtual functions executing on the PF circuitry are not permitted to modify the operational state of the GPU 105 because of the potential impact on the other virtual functions. Microcode executing on the GPU 105 can determine the operational state of the GPU 105 by accessing an operating mode indicator to determine whether the processing unit is operating in the first mode or the second mode. The host driver can modify the information stored by the operating mode indicator to indicate the different operational states of the GPU 105.

Figure 2:
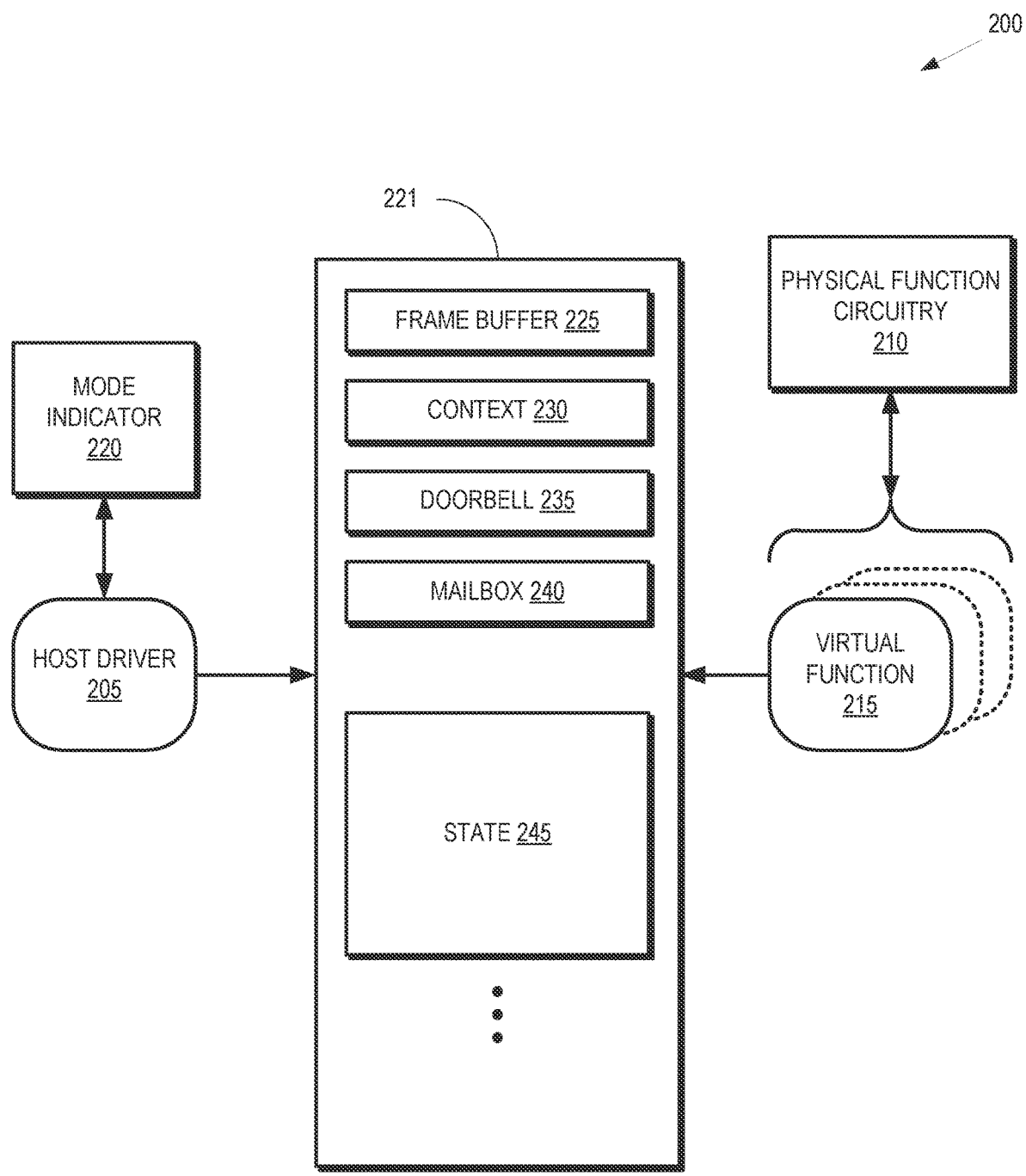
FIG. 2 is a block diagram of a processing system that provides selective access to registers by VFs according to some embodiments.

FIG. 2 is a block diagram of a processing system 200 that provides selective access to resources by VFs according to some embodiments. The processing system 200 is used to implement some embodiments of the processing system 100 shown in FIG. 1. In the illustrated embodiment, the processing system 200 implements a host driver 205, physical function circuitry 210, and one or more virtual functions (VFs) 215 that execute on the physical function circuitry 210, as discussed herein. A mode indicator 220 stores values that represent an operational mode of the processing system 200. In some embodiments, the mode indicator 220 as a first value that indicates that the processing system 200 is operating in a multi-VF mode that allows the physical function circuitry 210 to operate more than one VF 215 and a second value that indicates that the processing system is operating in a single-VF mode that constrains the physical function circuitry 210 to operate a single VF 215.

The processing system 200 implements a set 221 of resources that are allocated to the one or more VFs 215 executing on the physical function circuitry 210. In the illustrated embodiment, the set 221 is partitioned into subsets of resources that are allocated to the one or more VFs 215. For example, the set 221 is partitioned into a subset 225 that is reserved for frame buffers, a subset 230 that is reserved for context registers, a subset 235 that is reserved for doorbells, and a subset 240 that is reserved for mailbox registers. The set 221 also includes a subset that is reserved for registers (or other resources) that represent the state 245 of the processing system 200. Although the subset that represents the state 245 of the processing system 200 is part of the same set 221 that includes the subsets 225, 230, 235, 240 that are allocated to the VF 215, some embodiments implement these subsets in different locations or as part of different register sets in the processing system 200.

The VF 215 is selectively enabled to modify state 245 of the processing system 200 based on the operational mode of the processing system 200. In the illustrated embodiment, the host driver 205 determines the operational mode of the processing system 200 by updating the mode indicator 220. If the host driver 205 determines and updates the mode indicator 220 to a first value indicating a multi-VF mode, then access to the state 245 by the VF 215 is disabled, even if only a single VF 215 is executing on the PF circuitry 210. If the host driver determines and updates the mode indicator 220 to a second value indicating a single-VF mode, then access to the state 245 by the VF 215 is enabled, e.g., interrupts can be generated to GPU blocks (such as the SMU) by the VF 215. Some embodiments of the host driver 205 modify the information stored in the mode indicator 220 to indicate the operational mode of the processing system 200. For example, if the processing system 200 is configured to execute a performance monitoring tool that uses a single VF 215, the host driver 205 writes information to the mode indicator 220 to indicate that the processing system 200 is operating in the single-VF mode.

Figure 3:
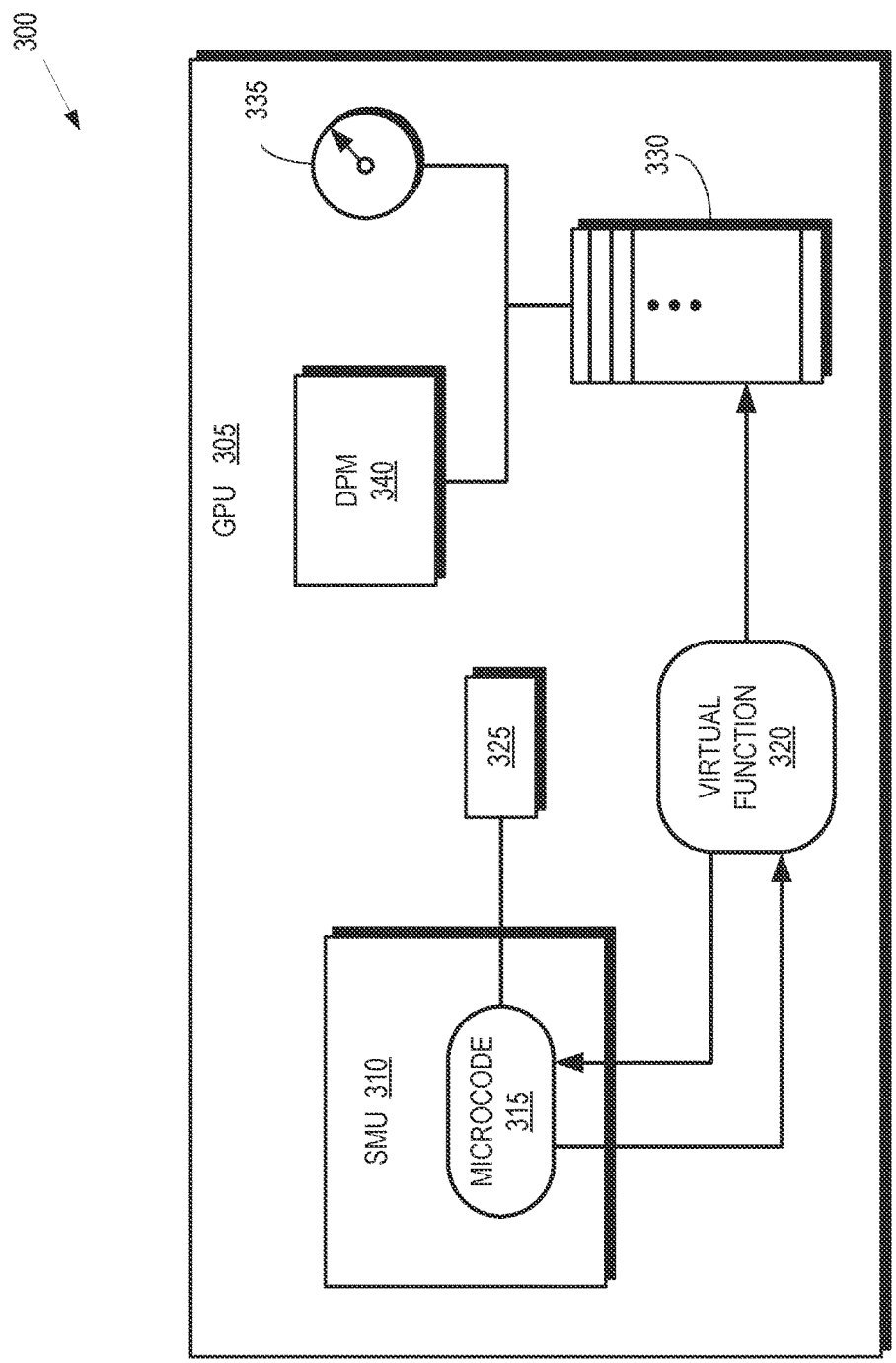
FIG. 3 is a block diagram of a processing system that selectively enables a VF to modify an operational state of a graphics processing unit (GPU) according to some embodiments.

FIG. 3 is a block diagram of a processing system 300 that selectively enables a VF to modify an operational state of a GPU according to some embodiments. The processing system 300 is used to implement some embodiments of the processing system 100 shown in FIG. 1 and the processing system 200 shown in FIG. 2. In the illustrated embodiment, the processing system 300 includes a GPU 305 and a system management unit (SMU) 310 that is incorporated in the GPU 305. Some embodiments of the SMU 310 are implemented as part of an accelerated processing unit (APU) that includes both the CPU and a GPU on one die. The SMU 310 is responsible for a variety of system and power management tasks during boot of the processing system 300 and at runtime for the processing system 300. The SMU 310 implements a microcontroller using microcode 315.

The GPU 305 executes one or more VFs 320 on corresponding PF circuitry (not shown in FIG. 3 in the interest of clarity) depending on the operational mode of the GPU 305. A mode indicator 325 is used to indicate the operational mode of the GPU 305. Some embodiments of the mode indicator 325 are set to a first value that indicates that the processing system 300 is operating in a multi-VF mode that allows the PF circuitry to operate more than one virtual function, e.g., by world/context switching between multiple instances of virtual functions. The mode indicator 325 is set to a second value to indicate that the processing system 300 is operating in a single-VF mode that constrains the PF circuitry to operate a single virtual function, e.g., world/context switches between different instances of virtual functions are not necessary.

A set of registers 330 (or other resources) stores information representing the state of the GPU 305. In the illustrated embodiment, subsets of the registers 330 are used to configure features of the GPU 305 such as a clock 335 running on the GPU 305, a dynamic power management (DPM) module 340 that controls the power state of the GPU 305 and the like. The microcode 315 running on the GPU 305 selectively enables the VF 320 to modify the state of the GPU 305 by modifying value stored in the registers 330. The microcode 315 allows modification of the registers 330 by the VF 320 in response to the mode indicator 325 indicating that the processing system 300 is operating in the single-VF mode. The microcode 315 does not permit the VF 320 to modify the registers 330 in response to the mode indicator 325 indicating that the processing system 300 is operating in the multi-VF mode. For example, if the virtual function 320 implements a performance monitoring tool that places the GPU 305 into the single-VF mode, microcode 315 permits the VF 320 to modify the operation of the clock 335, the DPM 340, or other feature of the GPU 305. The performance monitoring tool then performs measurements (e.g., of one or more performance counters) to assess the impact of the modification.

In the illustrated embodiment, the VF 320 modifies the registers 330 using interrupts that are transmitted to the SMU 310. The microcode 315 permits the VF 320 to issue interrupts to the SMU 310 and configures the SMU 310 to respond to the interrupts in response to the GPU 305 being in the single-VF mode. The microcode 315 executing on the SMU 310 monitors the interrupts and selectively approves modifications requested by the interrupts, e.g., based on risks associated with the modifications. The microcode 315 executing on the GPU 305 disables interrupt notification between the first VF 320 and the SMU 310 in response to the GPU 305 being in the multi-VF mode. In some embodiments, a host driver implemented in the GPU 305 denies requests from the VF 320 to modify the state of the GPU 305 in response to the GPU 305 being in the multi-VF mode.

Figure 4:
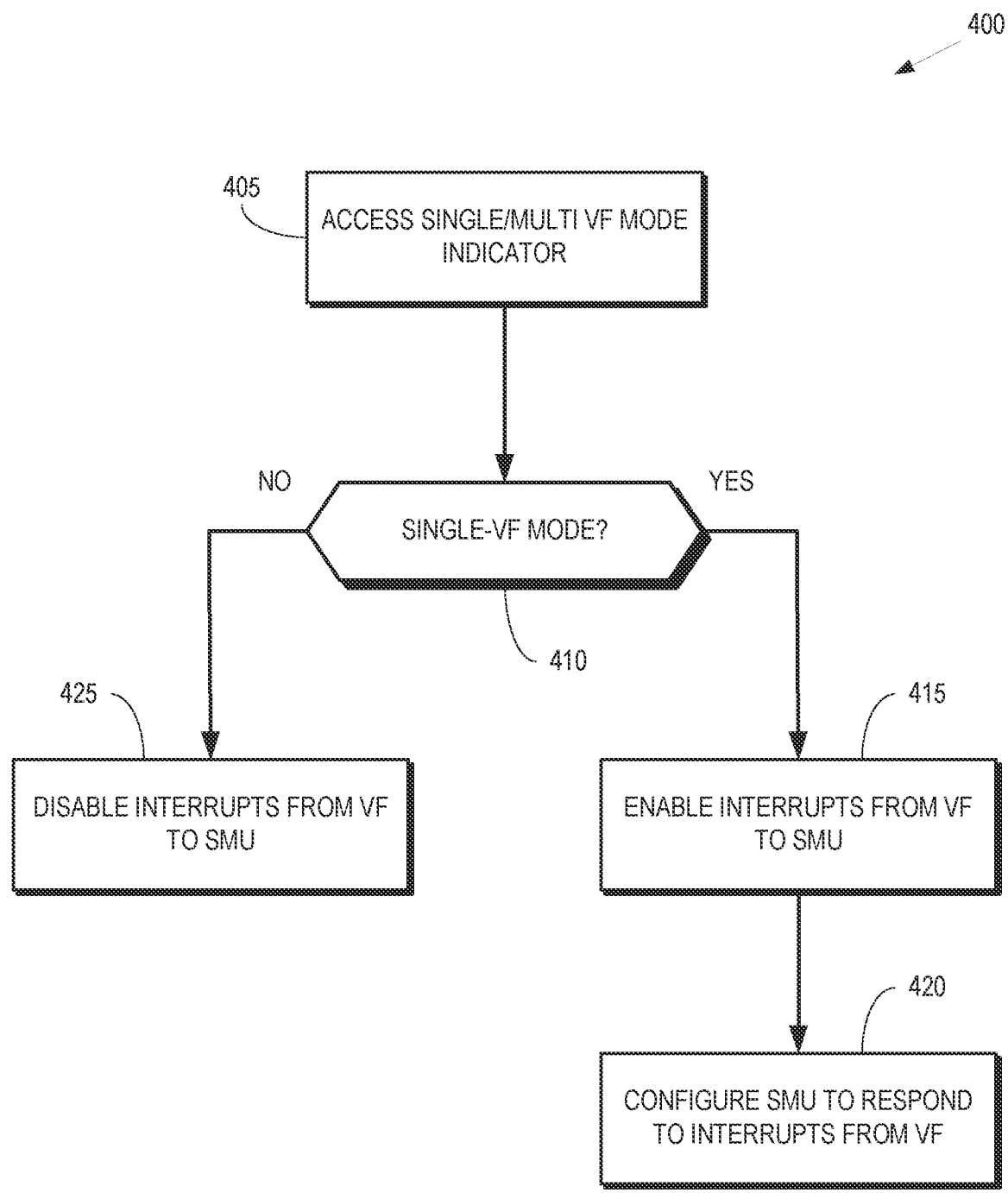
FIG. 4 is a flow diagram of a method of selectively enabling a VF to modify a state of a GPU according to some embodiments.

FIG. 4 is a flow diagram of a method 400 of selectively enabling a VF to modify a state of a GPU according to some embodiments. The method 400 is implemented in some embodiments of the processing system 100 shown in FIG. 1, the processing system 200 shown in FIG. 2, and the processing system 300 shown in FIG. 3.

At block 405, a host driver implemented in the GPU updates a mode indicator that indicates whether the GPU is operating in a single-VF mode or a multi-VF mode. At decision block 410, the microcode running on the SMU determines whether the GPU is operating in the single-VF mode based on the information in the mode indicator. If the GPU is operating in the single-VF mode, the method 400 flows to block 415. Otherwise, the method 400 flows to block 425.

At block 415, microcode executing on the GPU enables interrupts from the VF to an SMU in response to the GPU being in the single-VF mode. At block 420, microcode executing on the SMU configures the SMU to respond to interrupts received from the VF.

At block 425, interrupts from the VF to the SMU are disabled. In some embodiments, a host driver or microcode executing on the GPU disables the interrupts from the VF to the SMU. Requests from the VF to modify the state of the GPU are denied.

Figure 5:
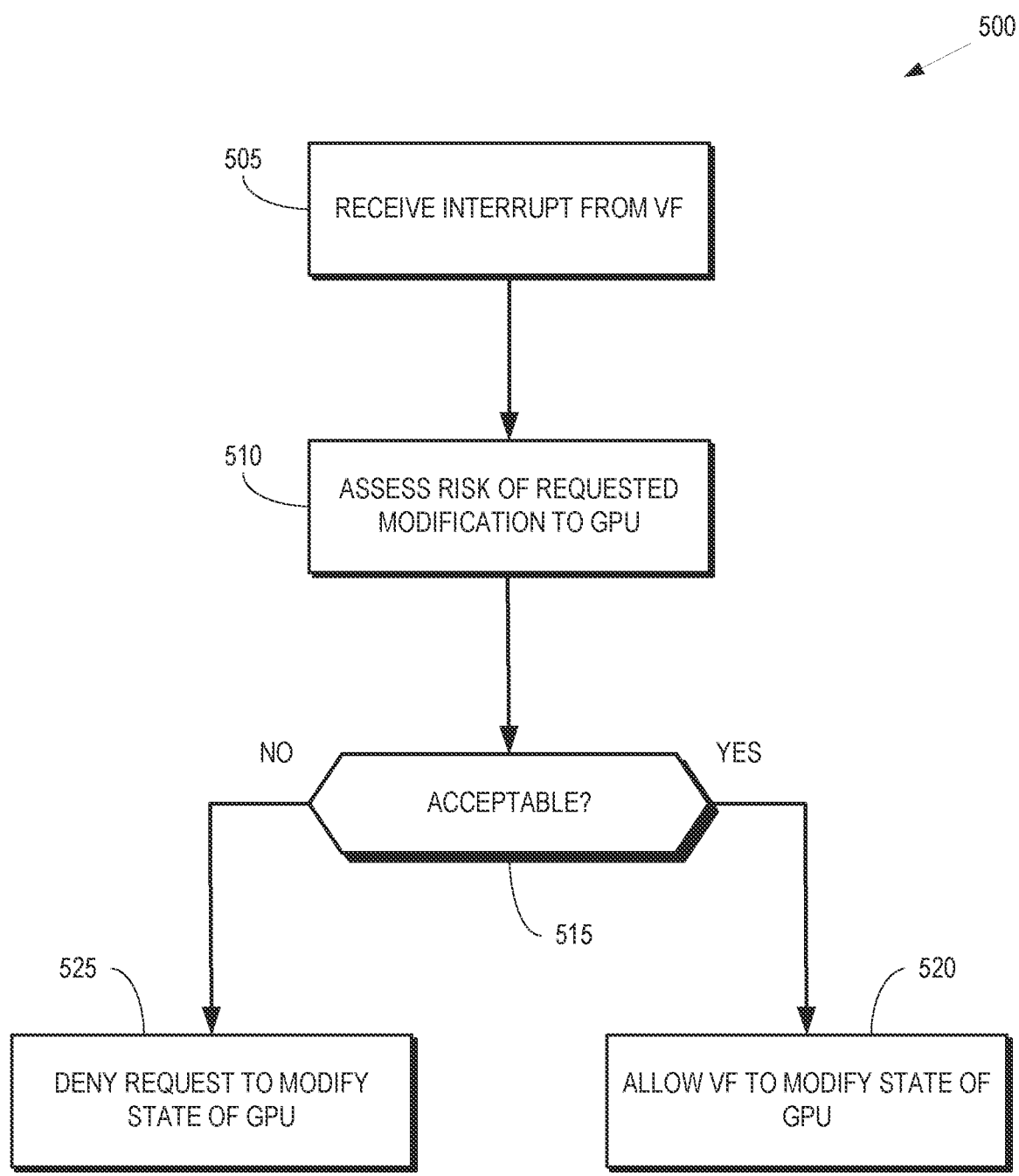
FIG. 5 is a flow diagram of a method of managing a request from a VF to modify a state of a GPU according to some embodiments.

FIG. 5 is a flow diagram of a method 500 of managing a request from a VF to modify a state of a GPU according to some embodiments. The method 500 is implemented in some embodiments of the processing system 100 shown in FIG. 1, the processing system 200 shown in FIG. 2, and the processing system 300 shown in FIG. 3. Some embodiments of the method 500 are implemented in microcode executing on an SMU, such as the microcode 315 executing on the SMU 310.

At block 505, the microcode receives an interrupt from a VF executing on the GPU, which is operating in a single-VF mode that permits the VF to issue the interrupt to the SMU. At block 510, the microcode assesses the risk of the requested modification to the GPU. At decision block 515, the microcode determines whether the risk is acceptable. For example, the microcode determines whether the risk of modifying a clock, a power management state, or other state of the GPU presents a risk that is below a threshold value. If so, the method 500 flows to block 520 and the microcode responds with information indicating that the VF is allowed to modify the state of the GPU. If the risk is unacceptable, e.g., if the risk is above a threshold value, the microcode responds (at block 525) with information denying the request to modify the state of the GPU.

A computer-readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
  a processing unit comprising physical function circuitry configured to execute virtual functions, the processing unit configured to execute a host driver to set a register value indicating the processing unit is to operate in a first mode that allows more than one virtual function to execute on the physical function circuitry; and
  a system management unit (SMU) for the processing unit, the SMU configured to execute microcode that, responsive to a determination based on the register value that the processing unit is operating in the first mode, disables interrupt notifications associated with operational state modifications of the processing unit.

2. The apparatus of claim 1, wherein to set the register value comprises setting an operating mode indicator configured to represent a first value indicating that the processing unit is operating in the first mode and a second value indicating that the processing unit is operating in a second mode that constrains the physical function circuitry to execute a single virtual function.

3. The apparatus of claim 2, further comprising:
a memory storing microcode configured to manipulate the processing unit to access the operating mode indicator to determine whether the processing unit is operating in the first mode or the second mode.

4. The apparatus of claim 1, wherein:
a first virtual function is configured to issue an interrupt to the SMU to modify an operational state of the processing unit.

5. The apparatus of claim 4, wherein the SMU is configured to selectively approve modifications requested by interrupts based on risks associated with the requested modifications.

6. The apparatus of claim 5, wherein the first virtual function is configured to execute a performance monitoring tool that assesses an impact of at least one of the selectively approved modifications.

7. The apparatus of claim 4, wherein the host driver is configured to deny requests from the first virtual function to modify the state of the processing unit in response to the processing unit being in the first mode.

8. The apparatus of claim 7, further comprising:
a mailbox register monitored by the host driver, wherein the first virtual function is configured to provide requests to modify the state of the processing unit to the mailbox register.

9. The apparatus of claim 1, wherein the operational state modifications of the processing unit comprises a modification to one or more of a group that includes a clock of the processing unit, a power state of the processing unit, or a power management state of the processing unit.

10. A method comprising:
setting a register value, by a host driver executing on a processing unit, to indicate that the processing unit is to operate in a first mode that allows more than one virtual function to execute on physical function circuitry of the processing unit; and
disabling, by microcode executing on a system management unit (SMU) of the processing unit and based on the register value indicating that the processing unit is operating in the first mode, interrupt notifications associated with operational state modifications of the processing unit.

11. The method of claim 10, wherein:
setting the register value comprises setting an operating mode indicator configured to a first value to indicate that the processing unit is operating in the first mode or a second value to indicate that the processing unit is operating in a second mode constraining the physical function circuitry to execute a single virtual function.

12. The method of claim 11, further comprising:
accessing, using microcode executing on the SMU, the operating mode indicator to determine whether the processing unit is operating in the first mode or the second mode.

13. The method of claim 11, further comprising:
issuing an interrupt from a first virtual function to the SMU based at least in part on the processing unit being in the second mode, and
responding, at the SMU, to at least one of the interrupts based at least in part on the processing unit being in the second mode.

14. The method of claim 10, further comprising:
selectively approving, by the SMU, one or more modifications to the state of the processing unit requested by interrupts based on risks associated with the one or more requested modifications.

15. The method of claim 14, further comprising:
executing, at the first virtual function, a performance monitoring tool to assess an impact of at least one of the selectively approved modifications.

16. The method of claim 10, further comprising:
denying, at the host driver and based on the processing unit operating in the first mode, requests from a first virtual function to modify the state of the processing unit.

17. The method of claim 16, further comprising:
providing, from the first virtual function, requests to modify the state of the processing unit to a mailbox register monitored by the host driver.

18. The method of claim 10, wherein the operational state modifications of the processing unit comprises a modification to one or more of a group that includes a clock of the processing unit, a power state of the processing unit, or a power management state of the processing unit.

19. A non-transitory computer-readable medium embodying a set of executable instructions, the set of executable instructions to manipulate at least one processor to:
set a register value, by a host driver executing on a processing unit, to indicate that the processing unit is to operate in a first mode that allows more than one virtual function to execute on physical function circuitry of the processing unit; and
disable, by microcode executing on a system management unit of the processing unit and based on the set register value, interrupt notifications associated with operational state modifications of the processing unit.

20. The non-transitory computer-readable medium of claim 19, wherein the operational state modifications of the processing unit comprise a modification to one or more of a group that includes a clock of the processing unit, a power state of the processing unit, or a power management state of the processing unit.

* * * * *